Feb. 22, 1927.
F. M. FURBER
BURNISHING MACHINE
Filed April 17, 1926
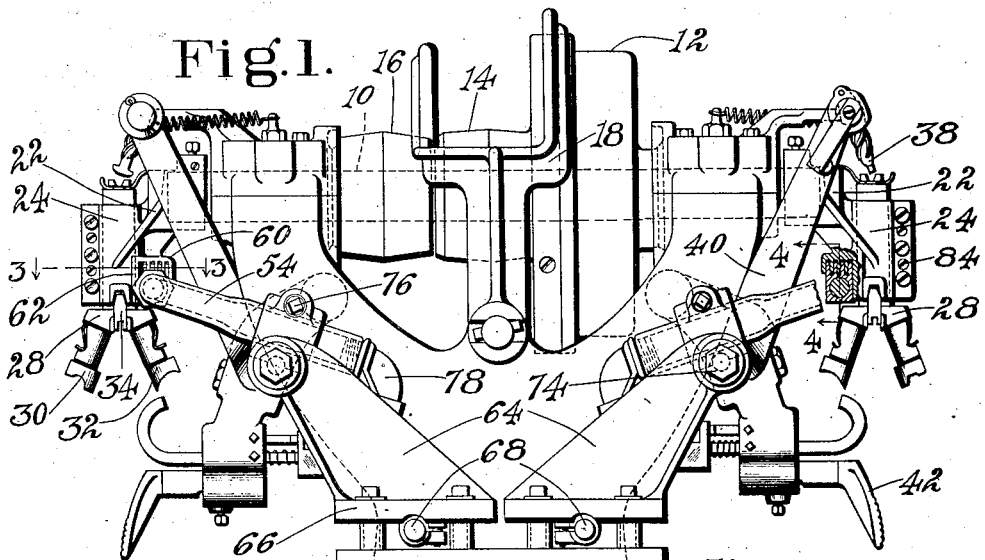
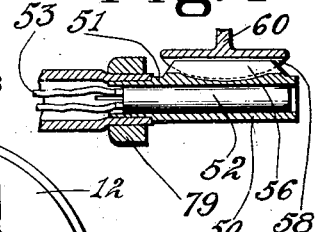
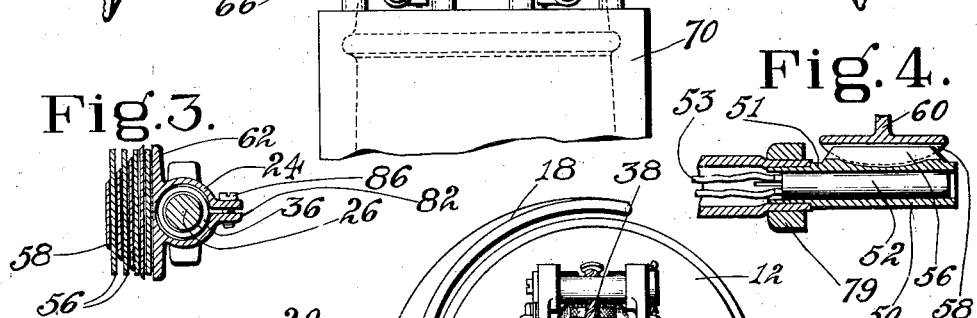
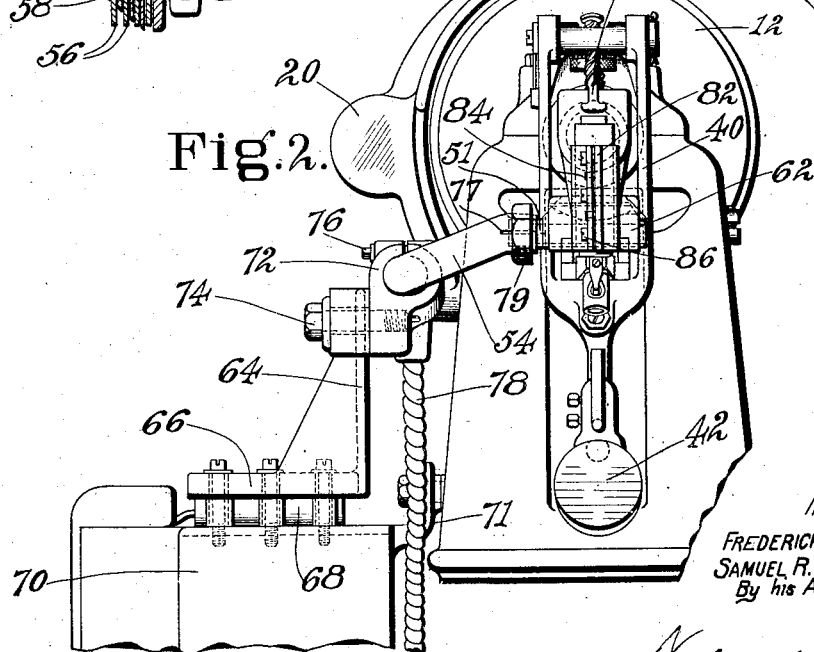
INVENTOR-
FREDERICK M. FURBER, DEC'D
SAMUEL R. CUTLER, ADMR.
By his Attorney
Nelson W. Howard Patented Feb. 22, 1927.

1,618,183

UNITED STATES PATENT OFFICE.

FREDERICK M. FURBER, DECEASED, LATE OF REVERE, MASSACHUSETTS; BY SAMUEL R. CUTLER, ADMINISTRATOR, OF REVERE, MASSACHUSETTS, ASSIGNOR TO UNITED SHOE MACHINERY CORPORATION, OF PATERSON, NEW JERSEY, A CORPORATION OF NEW JERSEY.

BURNISHING MACHINE.

Application filed April 17, 1926. Serial No. 102,774.

This invention relates to burnishing machines and is illustrated as embodied in an apparatus for transferring heat from an electrically heated unit to the rapidly moving tool of an edge-setting machine for burnishing the edges of the soles of boots and shoes.

The problem of heating the rapidly moving tool of such a burnishing machine by means of an electric unit mounted directly upon a moving part of the machine is rendered especially difficult by the rapid deterioration of the units themselves or of the leads by means of which current is supplied to said units owing to the stresses set up by the rapid movements of the parts. In view of this difficulty, there was provided by the invention set forth in United States Letters Patent No. 1,197,620, granted September 12, 1916, on the application of F. M. Furber, an improved burnishing machine organization in which the heat was transferred from a stationary unit to the moving burnishing tool by radiation, thus successfully preserving the units and their leads.

It is an object of this invention to provide a still further improved organization for transferring heat from an electric unit to a rapidly moving tool such as is found in an edge-setting machine, which, while retaining the advantages of the prior construction referred to, will be so constructed and arranged as to facilitate the transfer of heat and will minimize the energy required to transfer the heat necessary to bring the tool to the required temperature.

To this end, one of the features of the invention consists in a construction and arrangement for transferring heat from a stationary heating unit to a rapidly moving tool by radiation, in which one of the parts is provided with a rib and the other part with a groove adapted to receive said rib, the coacting surfaces of the several parts being arranged in close juxtaposition without actually contacting. Preferably, a plurality of similar ribs and grooves are provided upon the two members forming comb-like structures by means of which the area of the adjacent surfaces is increased to facilitate the economical transfer of heat without rendering the apparatus bulky or liable to interfere with the operation of the machine. Thus the advantages of the former construction referred to are retained and the waste of energy is minimized.

Another feature of the invention consists in a construction and arrangement of coacting ribbed and grooved members in which the bottom of a groove and the adjacent edge of a co-operating rib are each curved about the center of movement of the tool so that they are maintained with a substantially uniform spacing during the movement of the tool.

Still another feature of the invention, contributing to minimizing the waste of energy, consists in supporting the electrically heated member in such a manner that universal adjustment may be secured, in order that the coacting surfaces of the tool holder and said heated member may be brought into close juxtaposition and accurately positioned with respect to one another to maintain their close relation without actual contact irrespective of the changed relation of the parts resulting from their expansion during the heating process.

In another aspect the invention provides an improved holder for the spindle of the tool-supporting member of a burnishing machine having a plurality of tools which are to be interchanged to bring one after another of the tools into operative position. In accordance with this feature of the invention, the illustrated holder comprises a split casing receiving the spindle of the tool-supporting member and provided with means for adjusting the internal diameter of said split casing so that the spindle may be freely rotated after the parts have become heated without requiring excessive accuracy of manufacture.

These and other features of the invention to be defined in the claims will be described in the following specification and illustrated in the accompanying drawings in which:

Fig. 1 is a side view of a twin edge-setting machine embodying the novel features of the invention;

Fig. 2 is an end view of such a machine;

Fig. 3 is a horizontal section upon an enlarged scale taken on the line 3—3 of Fig. 1; and Fig. 4 is a vertical section taken on the line 4—4 of Fig. 1.

Although it will be evident, after a consideration of the following description, that various features of the invention are applicable to various types of machines, the invention will be described herein for the sake of illustration as embodied in an edge-setting machine of the type set forth in United States Letters Patent No. 1,284,303, granted November 12, 1918, upon the application of F. M. Furber. In the illustrated machine oscillating movement is imparted to a shaft 10 by means of mechanism contained within a casing 12 to which power may be supplied from an external source through fast and loose pulleys 14 and 16. A belt shifter 18 is provided with a finger piece 20 to facilitate the shifting of the belt from one pulley to the other. The particular machine illustrated is a twin machine having at each end of the oscillating shaft 10 a depending rocker arm 22 provided near its outer end with a split casing 24 adapted to receive a substantially vertical stud 26 of a tool carrier 28 supporting a plurality of burnishing tools 30 and 32. These tools are adapted to be brought alternately into operative position and held there by means of projections 34 coacting with suitably shaped recesses formed at the lower end of the casings 24. Springs 36 (Fig. 3) surrounding the tool holder studs 26 are arranged to hold the tool holders in one position while permitting depression to unlock them as they are rotated by means of the threaded screwdriver-like elements 38 carried at the outer ends of swinging frames 40. These frames are adapted to be actuated by pressure applied to hand plates 42 provided at the lower ends of the levers.

In order to supply heat to the rapidly moving tool, a metal block 50 is rigidly supported from the frame of the machine and provided with an electric cartridge unit 52 (Fig. 4) adapted to be brought to the proper temperature by means of an electric current supplied through insulated leads 53 passing through supporting members 54 (Fig. 1). The upper side of the block 50 is provided with a comb-like structure comprising a plurality of spaced ribs 56 forming intermediate grooves adapted to co-operate with the depending ribs 58 of a comb-like structure 60 formed integrally with the casings 24 and the rocker arms 22. The depending ribs 58 are of varying lengths as shown in Fig. 3. The coacting surfaces of the respective ribs of the comb-like structure 60 and the heated block 50 are accurately machined and are dimensioned so that, after they have become heated, their adjacent lateral surfaces are spaced apart only a few thousandths of an inch, thus bringing them into close justaposition so as to reduce the resistance to the flow of heat without actual contact between the parts such as might set up undue friction and a possible binding of the moving parts of the machine. One of the coacting lateral surfaces of the comb-like structure 60 is formed upon a flange 62 (Fig. 3) adjacent to the casing 24, and this surface, like the other surfaces of the adjacent ribs, is spaced from the surface of the adjacent rib and lies in a plane parallel to the plane of oscillation of the tool which, in the illustrated machine, is perpendicular to the axis of the oscillating shaft 10. In order still further to facilitate the transfer of heat from the stationary member to the moving part of the machine without substantial waste of energy, the end surfaces of the ribs 58 and the adjacent surfaces at the bottoms of the grooves in which these ribs are received are curved about the center of oscillation so that they may be maintained substantially equidistant and in the closest possible relation without actual contact as the tool-carrying member is oscillated. This is best illustrated in Fig. 4, from which it will be seen that the lower edges of the ribs 58 on the comb-like structure 60 and the bottom surfaces of the grooves between the ribs 56 of the heater block 50 are curved about the center of oscillation.

In view of the very close relation of the coacting surfaces of the heater block 50 and the comb-like structure 60, the hollow supporting arms 54 are mounted for universal adjustment upon brackets 64 formed integrally with plates 66, which are commonly provided in such machines for the reception of spare tools, said plates being heated themselves by means of electric units 68 and supported upon the upper side of a rheostat casing 70 attached to the frame of the machine by means of a bracket 71 (Fig. 2). The relative temperatures of the plates 66 and the blocks 50 are such that there is no tendency for the heat of the units 52 to escape to the frame of the machine. The supporting arrangement for each of the hollow arms 54 comprises a split sleeve 72 pivotally mounted for adjustment around a horizontal axis and adapted to be secured in position by means of a bolt 74. This split sleeve 72 allows the arm 54 to be properly adjusted within the sleeve, either by sliding movement or by rotation around the axis of the bore of the sleeve, after which the arm may be clamped in position by means of a bolt 76. It will be noted from an inspection of Figs. 2 and 4 that the heater blocks 50 are secured to the ends of the bracket arms by splitting the ends of said arms at 77 and providing clamping nuts 79 to clamp the ends of the arms about the projecting necks 51 of said blocks, thus allowing adjustment about another horizontal axis substantially parallel to the axis of the bolts 74. Suitable conduit members 78 are connected to the outer ends of the hollow arms 54 to protect the leads 53 passing from the heating units 52 to the rheostat casing 70.

It will be understood that the tool carrier studs 26 are journaled within the casings 24 and must be free for rotation with a minimum of effort during the interchange of the tools even after the parts have expanded on the application of heat. Accordingly, and in order that the machining of the respective bearing surfaces may be conducted with a minimum of accuracy, the casings 24 are split and provided with outwardly extending flanges 82 (Fig. 3). This also allows for the adjustment of the parts after the application of heat and to facilitate this adjustment, small headless abutment screws 84 (Figs. 1 and 2) are threaded in one of the flanges 82 and brought to bear against the other flange, thereby accurately to determine the spacing of said flanges. Other screws 86 (Fig. 3) are threaded through the two flanges 82 and arranged to clamp them tightly together in their adjusted positions as determined by the abutment screws 84.

After the machine has been set up and heat supplied, the hollow supporting arms 54 for the heater blocks 50 may be adjusted and the casings 24 may be adjusted by means of the screws 84 and 86 after which no further attention will be necessary for these parts. The amount of heat supplied to the tools will then be controlled in the usual fashion by means of rheostats (not shown) within the casings 70, and the burnishing machine will be operated in the usual manner to finish the boot and shoe parts which are applied thereto.

Having thus described the invention, what is claimed as new and it is desired to secure by Letters Patent of the United States is:

1. In a machine of the class described, a tool holder moving in a fixed plane and having a surface in a plane parallel to the plane of movement, an electric heating device having a surface adapted to be positioned closely adjacent to said first named surface, and means for supporting said heating element constructed and arranged to allow universal adjustment thereof in order that the coacting surfaces may be brought closely adjacent one to the other without contact.

2. In a machine of the character described, a moving tool, a stationary heated member positioned closely adjacent to said tool, and means for facilitating the transfer of heat as heat is radiated from said heated member to said tool comprising a rib upon one of the parts, the other part being formed to provide a groove having its faces in close juxtaposition to said rib for receiving said rib.

3. In a machine of the character described, an oscillating tool holder, a stationary heated member positioned closely adjacent to said tool holder, and means for facilitating the transfer of heat from said heated member to said tool holder comprising a rib upon one of the parts, the other part being formed to provide a groove for receiving said rib, the edge of said rib and the bottom of said groove being curved about the center of oscillation so that they are substantially equidistant in all positions of the tool holder.

4. In an edge setting machine for boots and shoes, an oscillating tool holder provided with a rib, and a stationary metal block containing an electric heating unit carried by the frame of the machine and provided with a groove adapted to receive said rib.

5. In a machine of the character described, an oscillating tool holder provided with a rib, a stationary metal block containing an electric heating unit carried by the frame of the machine and provided with a groove adapted to receive said rib, and means for supporting said metal block constructed and arranged to allow universal adjustment thereof in order that the grooved member may be brought into close proximity to the rib without actually contacting therewith.

6. In a machine of the character described, an oscillating tool holder provided with a rib, and a stationary metal block containing an electric heating unit carried by the frame of the machine and provided with a groove adapted to receive said rib, the coacting lateral surfaces of the groove and the rib being disposed in planes parallel to the plane of oscillation.

7. In a machine of the character described, an oscillating tool holder provided with a rib, and a stationary metal block containing an electric heating unit carried by the frame of the machine and provided with a groove adapted to receive said rib, the adjacent surfaces of the edge of the rib and the bottom of the groove being curved about the center of oscillation.

8. In a machine of the character described, a stationary metal block containing an electric heating unit carried by the frame of the machine and provided with a projecting rib, and an oscillating tool holder provided with a groove adapted to receive said rib.

9. In a machine of the character described, a stationary metal block containing an electric heating unit carried by the frame of the machine and provided with a projecting rib, an oscillating tool holder provided with a groove adapted to receive said rib, and means for supporting said metal block constructed and arranged to allow universal adjustment thereof in order that the grooved member may be brought into close proximity to the rib without actually contacting therewith.

10. In an edge setting machine for boots and shoes, a stationary metal block containing an electric heating unit carried by the frame of the machine and provided with a projecting rib, and an oscillating tool holder provided with a groove adapted to receive said rib, the coacting lateral surfaces of the groove and the rib being disposed in planes parallel to the plane of oscillation.

11. In a machine of the character described, an oscillating tool holder provided with a plurality of depending ribs and intermediate grooves, a metal block supported adjacent to said tool holder having a plurality of upstanding ribs and intermediate grooves adapted to mesh with the ribs and grooves on the tool holder, means for electrically heating said metal block, and means for supporting said block to hold it in close proximity to the tool holder without contacting therewith.

12. In a machine of the character described, an oscillating tool holder provided with a plurality of depending ribs and intermediate grooves, a metal block supported adjacent to said tool holder having a plurality of upstanding ribs and intermediate grooves adapted to mesh with the ribs and grooves on the tool holder, means for electrically heating said metal block, and means for adjustably supporting said block to hold it in close proximity to the tool holder without contacting therewith, the adjacent surfaces of the edges of the ribs on the tool holder and the bottoms of the grooves in the metal block being curved about the center of oscillation so that they are substantially equidistant in all positions of the tool holder.

13. In an edge setting machine for boots and shoes, a power-operated oscillating shaft, a rocker arm mounted on said shaft provided with a tool holder adapted to support a plurality of burnishing tools of different character, means for interchanging the position of the tools upon the tool holder, and means for supplying heat to said tool holder from an electrically heated unit comprising intermeshing comb-like ribbed members.

14. In an edge setting machine for boots and shoes, an oscillating rocker arm, means for supporting a plurality of tools in said rocker arm comprising a spindle arranged for rotation about an axis angularly related to the axis of oscillation, a split casing on said rocker arm receiving said spindle, and means for adjusting the position of the meeting edges of said split casing.

In testimony whereof I have signed my name to this specification.

SAMUEL R. CUTLER,
*Administrator of the Estate of Frederick M. Furber, deceased.*